Nov. 15, 1955    B. M. HYMAN    2,723,566
SYNTHETIC RUBBER CHAIN TIGHTENER BLOCK
Filed Nov. 1, 1952
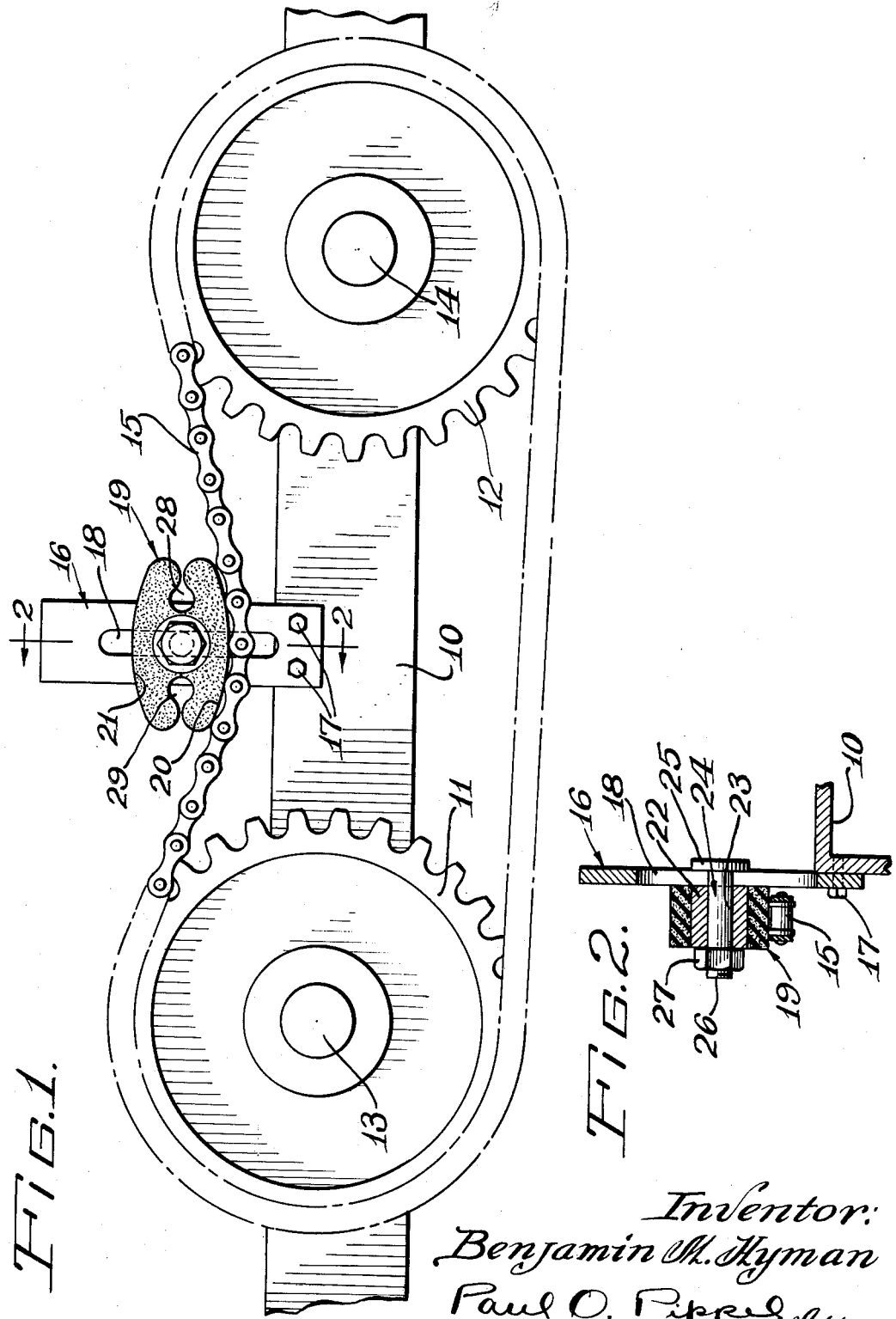
Inventor:
Benjamin M. Hyman
Paul O. Pippel Atty.

United States Patent Office 2,723,566
Patented Nov. 15, 1955

2,723,566

SYNTHETIC RUBBER CHAIN TIGHTENER BLOCK

Benjamin M. Hyman, East Moline, Ill., assignor to International Harvester Company, a corporation of New Jersey Application November 1, 1952, Serial No. 318,235

1 Claim. (Cl. 74—242.1)

This invention relates to a new and improved chain tightener block.

Chain tightener blocks are generally made from a hard wood and it is essential that the grain of the wood be just right in order to act efficiently as a long wearing chain tightener block. In addition to obtaining quality wood and proper grain within the wood block, suitable supporting holes must be drilled in the wood and the completed wood block must be impregnated in oil which latter process requires a considerable length of time. It is therefore desirable to eliminate the use of conventional chain tightener blocks made of wood and substitute therefor a uniformly standard tightener block which may be of any shape or form.

It is a principal object of this invention to provide a graphite impregnated synthetic rubber chain tightener block.

An important object of this invention is to supply a molded rubber having graphite impregnated throughout the body thereof and forming a chain tightener block of any desired shape or form with suitable mounting holes cored therein.

Still another important object of this invention is the provision of a molded rubber chain tightener block formed to permit yielding as in a spring and thus permitting yielding of the chain around the tightener block.

Other further and important objects of this invention will become apparent from the disclosures in the following specification and accompanying drawing.

In the drawing:

Fig. 1 is an elevational view of a chain drive having incorporated therein the chain tightener block of this invention; and Fig. 2 is a sectional view taken on the line 2—2 of Fig. 1.

As shown in the drawings, the reference numeral 10 indicated generally a support carrying spaced-apart sprockets 11 and 12. The sprockets 11 and 12 are mounted on shafts 13 and 14 respectively which are journaled for rotation in the supporting structure 10. A chain 15 is shown joining the sprockets 11 and 12 thereby imparting drive from one to the other.

A supporting bracket 16 is fastened to the supporting structure 10 by means of bolts 17. The bracket 16 is provided with a vertically disposed elongated slot 18. The bracket 16 is for the purpose of supporting a chain tightener block. The tightener block shown at 19 is made of molded synthetic rubber impregnated with graphite. The block 19 has a uniform dispersal of graphite entirely therethrough. The amount of graphite in the block must be sufficient to hold down the wear of the block. There is no chemical reaction of the rubber with the graphite other than that each performs its own function. The rubber absorbs the shocks of the chain load and the graphite takes the wear of the block and lubricates the sliding relationship of a chain over the tightener block. It is preferable that the graphite be mixed with the synthetic rubber prior to molding. The outer periphery of the molded tightener block 19 includes elongated lower and upper surfaces 20 and 21 as shown in Fig. 1 of the drawing. The tightener block 19 has its lower surface 20 convexly curved which bears directly against the chain 15. The vertical adjustment of the tightener block 19 within the elongated slot 18 in the bracket 16 provides for any chain tension which is found desirable.

As best shown in Fig. 2 the tightener block 19 is provided with a centrally disposed core or metallic sleeve 22 around which the graphite impregnated synthetic rubber is molded causing a vulcanizing adherence between the rubber and the core 22. The core 22 is equipped with a central aperture 23 which is adapted to receive passage of a bolt member 24. The bolt 24 includes a relatively large head 25 adapted to bear against the back surface of the bracket or block supporting plate 16. The width of the elongated aperture 18 is just slightly greater than the diameter of the bolt 24 so that the bolt will pass freely therethrough as shown in Fig. 2. The outer end portion of the bolt 24 is threaded as shown at 26 and a nut 27 engaging the threaded portion of the nut provides for suitable tightening of the block between the nut 27 and the bracket plate 16. The tightener block 19 may thus be adjustably positioned at any vertical level within the elongated slot 18.

The block 19 is further equipped with outwardly opening oppositely disposed "keyhole" slots 28 and 29 in the ends thereof. These keyhole slots convert the ends of the block into springs whereby the chain 15 being tightened thereby will be able to yield upwardly at spaced positions tending to close the slots 28 and 29 in the block simultaneously with the yielding or distortion of the synthetic rubber material from which the block is made. The tightener block of this invention differs materially from conventional wood tightener blocks in many respects. First the block is moldable to any desired shape or form and may include any desired coring to provide for mounting of the block in an operating position. There is no necessity for being concerned with the "grain" of the molded block inasmuch as the block is of uniform structure throughout and thus uniformly applicable as a tightener on any surface thereof. The impregnating of graphite directly into the molded synthetic rubber in the manufacture of the tightener block provides for constant lubrication of the block and thus eliminates the necessity of external lubrication of the tightener block or the soaking of the block in oil preliminary to use thereof. Although a molding of the block has been discussed it should be understood that the device may be extruded and the width of block desired obtained by the time of cut-off. The shape of the tightener block is such that it may be reversible to obtain uniform wear on both sides thereof. Similarly the shock cushioning effect of the synthetic rubber is enhanced by the integral formation of the ends of the block as springs.

Various details of construction may be varied throughout a wide range without departing from the principles disclosed herein and I therefore do not propose limiting the patent granted hereon otherwise than is necessitated by the appended claim.

What is claimed:

A chain tightener comprising a molded rubber block of a generally rectangular shape with the long sides thereof convexly curved outwardly, one of said long sides being employed for engagement with a chain, said rubber block having oppositely disposed short ends completing the generally rectangular shape, means in said block for fastening the block to an external support, said short ends of the block having outwardly opening keyhole shaped slots whereby the block is doubly resilient because of the inherent nature of the rubber and the springs formed by the keyhole shaped slots.

References Cited in the file of this patent

UNITED STATES PATENTS

| | | |
|---|---|---|
| 1,758,659 | Flury | May 13, 1930 |
| 1,879,287 | Johnson | Sept. 27, 1932 |
| 2,423,407 | Searles et al. | July 1, 1947 |
| 2,497,224 | Laure | Feb. 14, 1950 |

FOREIGN PATENTS

| | | |
|---|---|---|
| 628,803 | Great Britain | Sept. 5, 1949 |